US008270586B2

(12) United States Patent
Leung et al.

(10) Patent No.: US 8,270,586 B2
(45) Date of Patent: Sep. 18, 2012

(54) DETERMINING CONDITIONS OF CONFERENCES

(75) Inventors: Yiu-Ming Leung, Kirkland, WA (US); Jiannan Zheng, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1259 days.

(21) Appl. No.: 11/768,365

(22) Filed: Jun. 26, 2007

(65) Prior Publication Data

US 2009/0003575 A1 Jan. 1, 2009

(51) Int. Cl.
*H04M 3/42* (2006.01)
*H04L 12/16* (2006.01)
*H04Q 11/00* (2006.01)
*G06F 15/16* (2006.01)

(52) U.S. Cl. .................. 379/202.01; 370/260; 455/416; 709/204

(58) Field of Classification Search ............. 379/202.01, 379/201.01; 370/260, 259; 709/205, 204; 455/416
See application file for complete search history.

(56) References Cited

U.S. PATENT DOCUMENTS

| | | | |
|---|---|---|---|
| 6,115,720 A | 9/2000 | Bleizeffer et al. | |
| 6,442,758 B1 | 8/2002 | Jang et al. | |
| 6,678,730 B2 | 1/2004 | Hellerstein et al. | |
| 6,778,781 B2 | 8/2004 | Van Eijk et al. | |
| 6,826,683 B1 | 11/2004 | Suermondt et al. | |
| 6,854,069 B2 | 2/2005 | Kampe et al. | |
| 6,915,237 B2 | 7/2005 | Hashemian | |
| 7,136,399 B2 | 11/2006 | Lanigan et al. | |
| 7,492,730 B2 * | 2/2009 | Eshel et al. | 370/260 |
| 7,937,442 B2 * | 5/2011 | Sekaran et al. | 709/204 |
| 2004/0221202 A1 | 11/2004 | Nye et al. | |
| 2006/0026002 A1 | 2/2006 | Potekhin et al. | |
| 2006/0048017 A1 | 3/2006 | Anerousis et al. | |
| 2006/0112314 A1 | 5/2006 | Soto | |
| 2006/0233120 A1 * | 10/2006 | Eshel et al. | 370/260 |
| 2008/0010347 A1 * | 1/2008 | Houghton et al. | 709/205 |

OTHER PUBLICATIONS

"Technology Consultants", available at least as early as Feb. 22, 2007, at <<http://www.microsoft.com/technet/prodtechnol/sbs/2000/reskit/sbrk0003.mspx?mfr=true>>, Microsoft Corporation, 2007, pp. 1-4.

Tulloch, "How to Monitor the Health of Your PC", available at least as early as Feb. 22, 2007, at <<http://www.microsoft.com/windowsxp/using/setup/learnmore/tulloch_pc_health.mspx>>, Microsoft Corporation, 2007, pp. 1-8.

* cited by examiner

*Primary Examiner* — Thjuan K Addy
(74) *Attorney, Agent, or Firm* — Lee & Hayes, PLLC (57) ABSTRACT

Tools and techniques for determining conditions of conferences include calculating a global conference parameter that represents a rate at which several different conferences are processed. The machine may also calculate individual conference parameters representing a duration of time spent in processing the conferences considered individually.

20 Claims, 6 Drawing Sheets

DETERMINING CONDITIONS OF CONFERENCES

BACKGROUND

Conferencing solutions are increasingly moving to digital implementations based on servers, rather than bridging circuits or other analog connection techniques. In such server-based environments, the quality of the conferencing experience for conferees may depend on how heavily the server (and its central processor or CPU) is loaded at a given time. If the server becomes overloaded, the conferencing experience may deteriorate, and may eventually become unacceptable.

In light of the above considerations, previous approaches have tracked metrics, such as CPU utilization, to determine how heavily the server is loaded. However, CPU utilization may not provide a completely accurate metric of how heavily the server is loaded. Moreover it may not have a linear inverse relationship to the conference experience, making it hard to judge the quality of experience.

SUMMARY

Tools and techniques for determining conditions of conferences are described herein. These tools may provide machine-readable storage media that contain machine-readable instructions that, when executed by the machine, cause the machine to calculate a global conference parameter that represents a rate at which several different conferences are processed. The machine may also calculate individual conference parameters representing a duration of time spent in processing the conferences considered individually.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTIONS OF THE DRAWINGS

Tools related to determining conditions of conferences are described in connection with the following drawing figures. The same numbers are used throughout the disclosure and figures to reference like components and features. The first digit in a reference number indicates the drawing figure in which that reference number is introduced.

DETAILED DESCRIPTION

Overview

The following document describes tools capable of performing and/or supporting many techniques and processes. The following discussion describes exemplary ways in which the tools provide for determining conditions of conferences. This discussion also describes other techniques and/or processes that the tools may perform.

Figure 1:
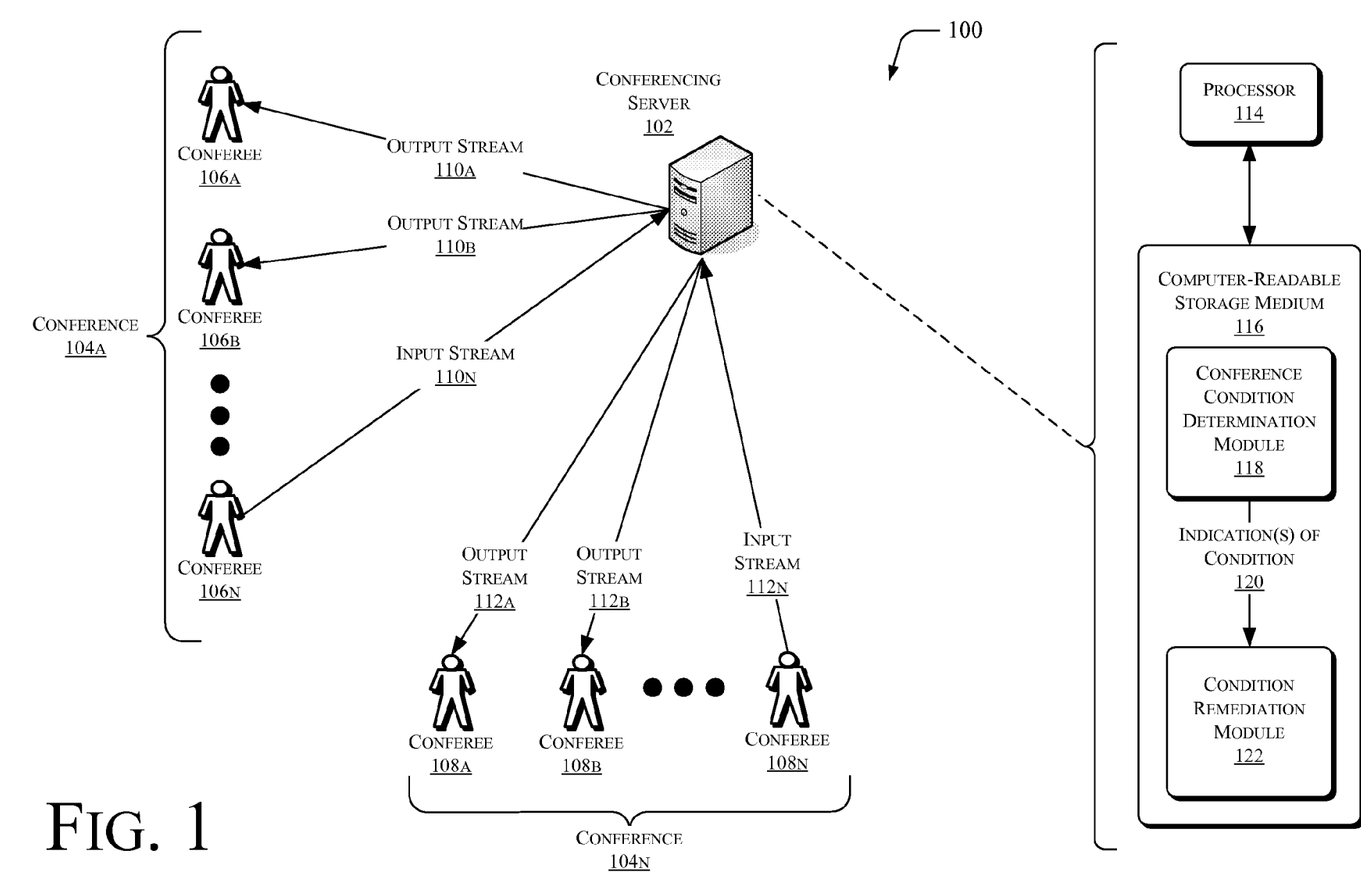
FIG. 1 is a block diagram illustrating systems or operating environments for determining conditions of conferences.

FIG. 1 illustrates systems and/or operating environments 100 for determining conditions of conferences. The systems 100 may include a conferencing server 102 that provides a platform supporting one or more conferences, with FIG. 1 denoting examples of conferences at 104a and 104n (collectively, conferences 104). It is noted that the systems 100 may include one or more conferencing servers 102, and different servers 102 may host any number of conferences 104, depending on, for example, the capacities of the servers, the sizes and types of the conferences, and/or other factors. The examples shown in FIG. 1 are provided only to facilitate the description herein, but do not limit possible implementations of the tools and techniques described herein.

A given conference 104 may be associated with two or more conferees. The conferencing server may maintain this association, and add or delete conferees from conferences over time, and may create or delete conferences as appropriate. FIG. 1 provides an example of the conference 104a including three conferees 106a, 106b, and 106n (collectively, conferees 106), and an example of the conference 104n including three conferees 108a, 108b, and 108n (collectively, conferees 108). However, it is noted that particular conferences may include any convenient number of conferees.

The conferencing server 102 may enable the conferees within a given conference to exchange information with one another. For example, in the conference 104a, FIG. 1 illustrates the conferee 106n originating a stream of information 110n to the conferencing server 102. In turn, the conferencing server routes this stream of information to the conferees 106a and 106b, as denoted respectively at 110a and 110b. The streams 110a, 110b, and 110n are collectively termed herein as streams 110. More particularly, FIG. 1 denotes the stream 110n as an "input" stream from the conferee 106n, and denotes the streams 110a and 110b as "output" streams from the conferencing server 102, within the context of the conference 104a.

Turning to the conference 104n and the conferees 108, FIG. 1 provides an example in which the conferee 108n originates an input stream 112n that is received by the conferees 108a and 108b. FIG. 1 denotes the streams as received by the conferees 108a and 108b respectively at 112a and 112b.

FIG. 1 is understood to provide an illustrative snapshot of the conferences 104 at a given instant in time. However, it is noted that, within any of the conferences, any of the conferees 106 or 108 may originate streams 110 or 112 at different times.

Turning to the streams 110 and 112 in more detail, these streams may represent, for example, audio and/or video information passed between and among the conferees. However, these streams may also represent data in the form of images, slideshows, web conferences, instant messages or text messages, game data, mouse clicks or other input, or the like.

Turning to the conferencing server in more detail, it may be a computer-based system that includes one or more processors, denoted at 114. These processors may also be categorized or characterized as having a given type or architecture, but may or may not have the same type or architecture.

The conferencing server may also include one or more instances of machine-readable or computer-readable storage media, denoted generally at 116. The computer-readable media 116 may contain instructions that, when executed by the processor 114, perform any of the tools or related functions that are described herein as being performed by the conferencing server. The processor may access and/or execute the instructions embedded or encoded onto the computer-readable media, and/or may access data stored in the computer-readable media. Additionally, it is noted that the computer-readable storage media, and any software stored thereon, may reside on hardware other than a conferencing server without departing from the scope and spirit of the description herein. The examples shown in FIG. 1 are provided only to facilitate discussion, but not to limit possible implementations.

Turning in more detail to the computer-readable media 116, it may include one or more instances of a conference condition determination module 118. The conference condition module 118 may analyze and generate metrics representing aspects of the hosted conferences viewed globally, and/or metrics representing aspects of the hosted conferences viewed individually. These metrics may indicate the condition of the hosted conferences from a global perspective and/or an individual perspective. This condition may indicate the "health" of the various conferences, as well as indicating the "health" of the conferencing server itself in hosting the various conferences. Put differently, the conference condition module 118 may generate data or signals, denoted generally at 120, indicating the condition of the conferences at different instances in time. The value of the conference condition signal 120 may indicate how heavily loaded the conferencing server is at different given times.

The computer-readable media 116 may also include a condition remediation module 122, which may receive the conference condition signal 120. In response to the conference condition signal, the condition remediation module may take appropriate action to alleviate any overloading of the conferencing server, or of any network over which the conferencing server and the conferees communicate. For example, assuming that the streams 110 and 112 are transmitted in packet form, the condition remediation module 122 may select codecs that consume less network bandwidth, may send only particular types of frames that consume the least amount of bandwidth (e.g., I-frames), may bar the creation of any new conferences until conditions improve, and/or other remedial processing.

Figure 2:
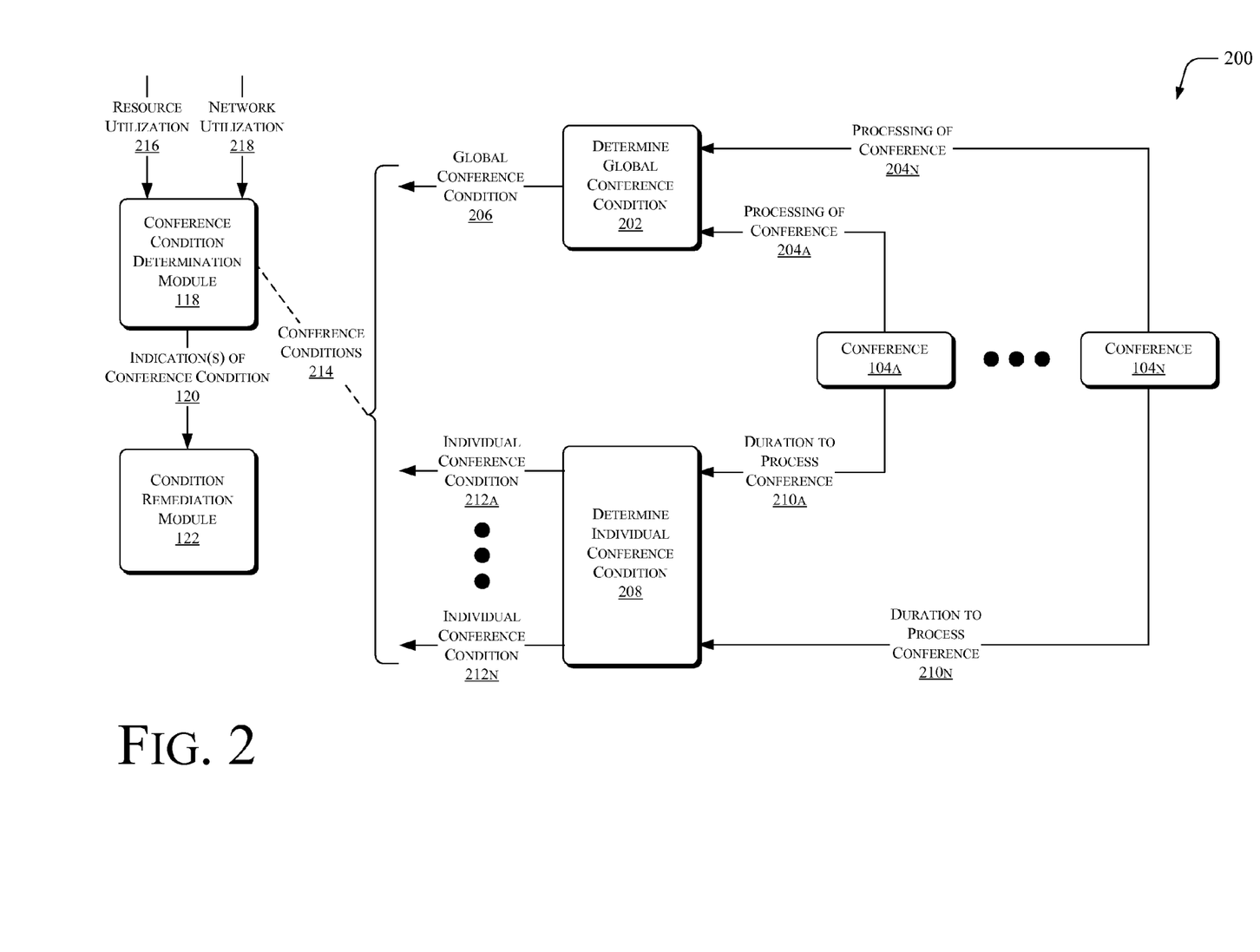
FIG. 2 is a block diagram illustrating additional aspects of determining conditions of conferences, more particularly, for determining conditions of conferences globally and/or individually.

Having described the systems or operating environments for determining conditions of conferences in FIG. 1, the discussion now turns to a description of additional aspects of determining conditions of conferences, now presented with FIG. 2.

FIG. 2 illustrating additional aspects, denoted generally at 200, of determining conditions of conferences, more particularly, for determining conditions of conferences globally and/or individually. For convenience of description, but not to limit possible implementations, some items described previously may be carried forward into FIG. 2 and denoted by similar reference signs.

FIG. 2 carries forward the conference condition module 118, for convenience, but not to limit implementations. As described previously, the conference condition module may determine the condition, or "health", of conferences that are hosted on a given conferencing server. FIG. 2 denotes examples of two such conferences at 104*a* and 104N, and represents determining the global health of these conferences at 202.

The determination represented in block 202 may include determining how many conferences the conferencing server is processing or servicing per unit time. FIG. 2 denotes processing associated with the conference 104*a* at 204*a*, and denotes processing associated with the conference 104N at 204N. In an example where the streams are encapsulated in packets, this processing may include, but is not limited to, sampling incoming packets from conferees, mixing outgoing packets for distribution to recipients, processing these incoming and outgoing packets through appropriate codecs, encrypting and decrypting these packets, analyzing backgrounds of video to determine differentials between successive frames of video, or the like.

In an example, assume that the conferences hosted by a given conferencing server are to be processed at some goal rate per unit time. Without limiting implementations, assume that this goal is to process a given conference at least 50 times per second. In this example, assume further that the conferencing server can process this given conference as fast as 200 times per second under a no-load condition. As the conferencing server become more heavily loaded, more conferences and related processing will contend for the server's processor (e.g., 114 in FIG. 1), and the server's ability to service all conferences at the goal rate may degrade. Conversely, as the conferencing server become less heavily loaded, fewer conferences and related processing will contend for the server's processor (e.g., 114 in FIG. 1), and the server's ability to service all conferences at the goal rate may improve.

The condition determination block 202 may compute a conference processing rate, indicating how many conferences are being processed per second. This conference processing rate may be computed to include all conferences hosted by a given conferencing server (e.g., 104*a* and 104N in FIG. 2). Thus, this conference processing rate may provide a global measure indicating how well the conferencing server is hosting the conferences as a whole. The condition determination block 202 may output a parameter, denoted at 206, representing how many conferences the conferencing server is processing per unit time (e.g., per second).

In some cases, the conference processing rate may provide a reasonably good approximation of how heavily the conferencing servers are loaded. However, consider an example in which a given conferencing server is hosting one relatively large conference having numerous conferees, along with many smaller conferences having relatively fewer conferees. The large conference would typically impose a heavier processing burden on the conferencing server, owing to the larger number of packets flowing to and from the numerous conferees. The smaller conferences, although more numerous, may impose less of a burden on the conferencing server, because the smaller conferences respectively include fewer conferees.

In this example, the conference processing rate may be favorable, viewed globally across all conferences large and small. This global conference processing metric may reflect the combined processing rate of the larger conference and the numerous smaller conferences. The processing rate for the numerous smaller conferences may be acceptable, but the processing rate for the larger conference may be unacceptably low. However, the global processing rate may nevertheless be acceptable, because the higher processing rates for the numerous smaller conferences offset or mask the lower processing rate for the single large conference.

To detect the foregoing scenario, the conference condition module 118 may also provide capability to determine the condition, or "health", of individual conferences, as represented generally by block 208. The individual conference determination block 208 may approximate or measure the condition of individual conferences by computing how much time was spent in processing the individual conference. FIG. 2 denotes the duration between processing the conferences 104*a* and 104*n* respectively at 210*a* and 210*n* (collectively, durations 210). These durations 210 may be embodied in signals or data representing how much time has passed between processing passes dedicated to the individual conferences. The conference determination block 208 may compute individual conference conditions based on these durations 210, and may output data or signals representing the conditions of individual conferences 104*a* and 104*n*, denoted respectively at 212*a* and 212*n* (collectively, individual conference condition signals 212).

The global condition signals 206 and the individual condition signals 212 may collectively form conference condition signals 214. In addition to the conference condition signals 214, the condition determination module may also analyze signals representing utilization of global resources associated with the conferencing server, with FIG. 2 denoting these signals at 216. Examples of such global resources may include, but are not limited to, memory, processor, storage space, or the like. The condition determination module may also analyze signals representing utilization of network resources or bandwidth associated with the conferencing server, with FIG. 2 denoting these signals at 218.

For convenience, but not limitation, FIG. 2 carries forward the signals 120, which represent at least the conference condition signals 214 as passed to the condition remediation module 122. The signals 120 may also include the resource utilization signals 216 and/or the network utilization signals 218.

Figure 3:
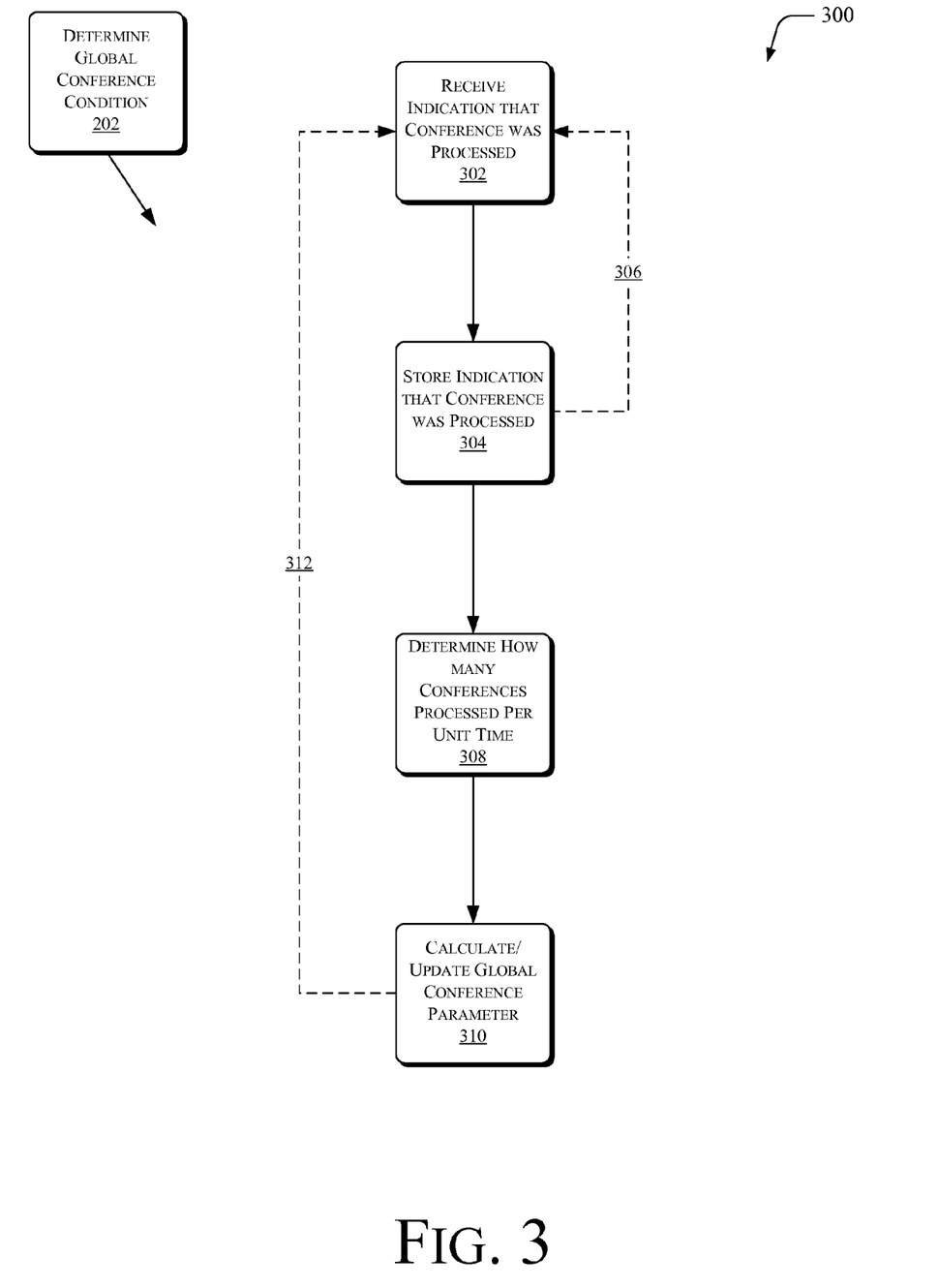
FIG. 3 a flow diagram illustrating processes for determining a global conference condition.

Having described the additional aspects of determining conditions of conferences in FIG. 2, the discussion now turns to a description of processes for determining a global conference condition, now presented with FIG. 3.

FIG. 3 illustrates processes, denoted generally at 300, for determining a global conference condition. For convenience of description, but not to limit possible implementations, some items described previously may be carried forward into FIG. 3 and denoted by similar reference signs. Additionally, for ease of reference only, the processes 300 are described in connection with the module 202 for determining the global conference condition. However, it is noted that implementations of the processes 300 may be executed on components or systems other than the module 202 without departing from the scope and spirit of the description herein.

Block 302 represents receiving an indication that a given conference was processed. FIG. 2 illustrates examples of such conference processing at 204*a* and 204*n*, and the description above provides several non-limiting examples of such processing. Additionally, FIG. 1 provides examples of conferences at 104*a* and 104*n*.

Block 304 represents storing an indication that a given conference was processed. Put differently, block 304 may represent storing data that forms the basis for calculating a running average of how many conferences have been processed per unit time, as calculated over some suitable time interval.

As indicated by the dashed line 306, the processes 300 may repeated perform blocks 302 and 304 repeatedly as the conferences (e.g., 104) are processed. In some implementations, the processes 300 may perform blocks 302 and 304 as a background process that tracks how many conferences have been processed, and when those conferences were processed.

Block 308 represents determining how many conferences have been processed per unit time. Block 308 may make this determination by accessing information stored by block 304, which information indicates processing history gathered over an interval of time (e.g., the previous ten seconds).

Block 310 represents calculating a parameter that represents a condition or health associated globally with all conferences hosted by a given conferencing server. This parameter may indicate how many conferences the server is processing per unit time (e.g., per second). As described herein, this quantity is termed a "conference processing rate". As indicated by the dashed line 312, the processes 300 may be repeated indefinitely to track the global conference processing rate over time, and to update the conference processing rate accordingly. The conference processing rate over time may indicate, at least in part, how heavily loaded the conferencing server is, and may indicate when remedial action is appropriate to alleviate the loading on the conferencing server.

Figure 4:
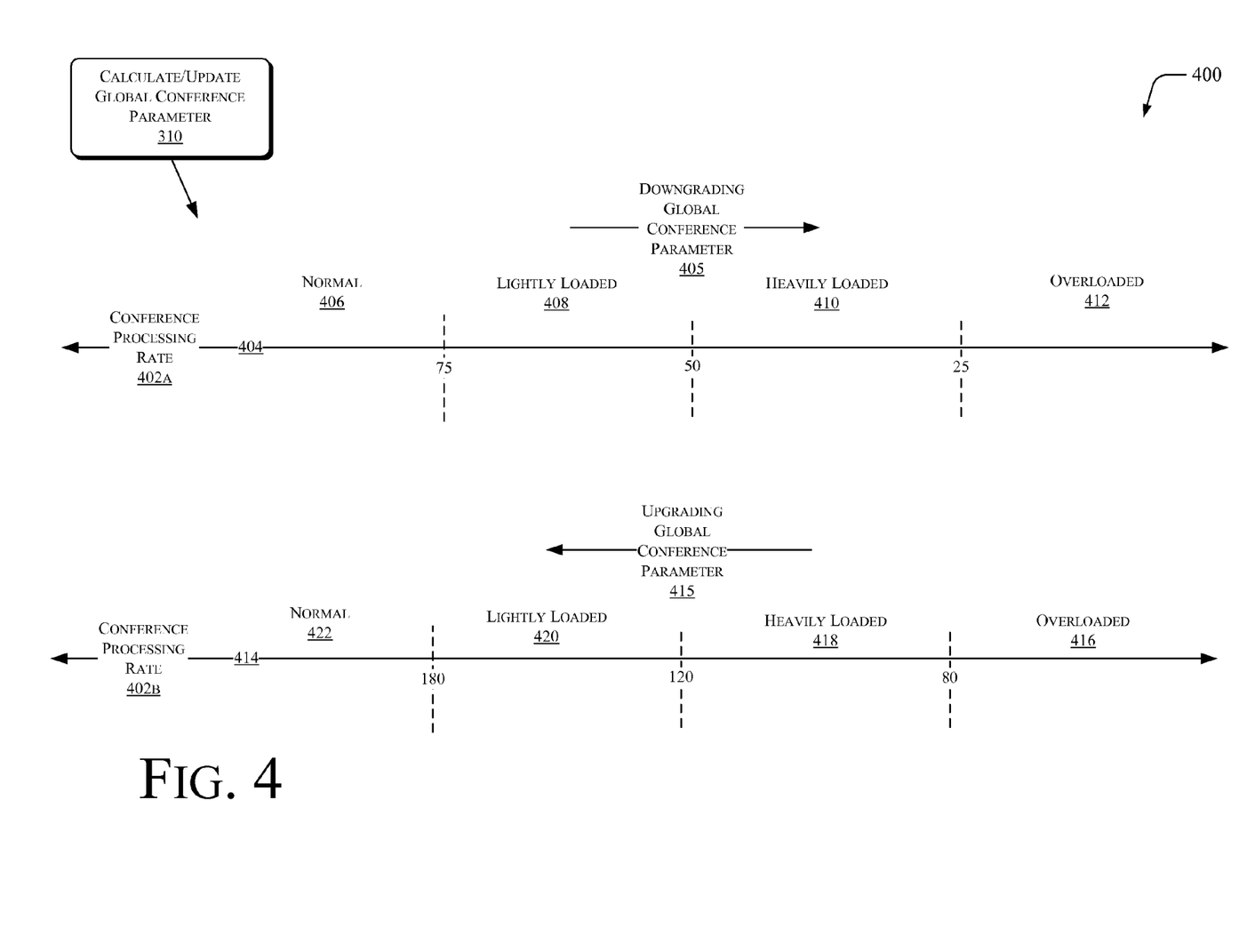
FIG. 4 is a diagram illustrating transitions between different global conference conditions, and illustrating techniques for upgrading and/or downgrading the global conference conditions as a conference processing rate changes over time.

Having described the processes for determining a global conference condition in FIG. 3, the discussion now turns to a description of different global conference conditions, now presented with FIG. 4.

FIG. 4 illustrates examples, denoted generally at 400, of different global conference conditions, and illustrates techniques for upgrading and/or downgrading the global conference parameter as the conference processing rate changes over time. For convenience of description, but not to limit possible implementations, some items described previously may be carried forward into FIG. 4 and denoted by similar reference signs. Additionally, for ease of reference only, the examples 400 are described in connection with the module 310 for calculating and updating the global conference parameter. However, it is noted that implementations of these examples 400 may be executed on components or systems other than the module 310 without departing from the scope and spirit of the description herein.

As shown in FIG. 4, several example conference processing rates 402*a* are arranged along an axis 404. The global conference parameter may be assigned a value, based on the value of the conference processing rate. In some cases, the global conference parameter may inherit the conference processing rate directly.

FIG. 4 illustrates several thresholds defined for the conference processing rate, and also provides examples of labels that may be associated with regions falling between these various thresholds. These conference processing rates and labels are chosen only for ease of description, and do not limit possible implementations. It is particularly noted that these thresholds for the conference processing rate may be arbitrarily chosen in implementations as appropriate, in terms of how many thresholds are deployed and where those thresholds are deployed.

The axis 404 indicates thresholds used when the conference processing rate is decreasing over time, leading to possibly downgrading the global conference parameter, as denoted at 405. In an example shown in FIG. 4, when the conference processing rate is above 75 conferences processed per second, the global conference parameter may be assigned a value indicating that the conferencing server is "normally" loaded. FIG. 4 denotes this condition at the region 406.

When the conference processing rate drops below 75, the global conference parameter may be assigned a value indicating that the conferencing server has become "lightly" loaded. FIG. 4 denotes this condition at the region 408.

When the conference processing rate drops below 50, the global conference parameter may be assigned a value indicating that the conferencing server has become "heavily" loaded. FIG. 4 denotes this condition at the region 410.

When the conference processing rate drops below 25, the global conference parameter may be assigned a value indicating that the conferencing server has become "overloaded". FIG. 4 denotes this condition at the region 412.

As also shown in FIG. 4, additional conference processing rates 402b may be arranged along an axis 414, to indicate thresholds related to upgrading the global conference parameter as the conference processing rate increases, as denoted at 415. In this manner, as the conferencing server becomes less loaded, the conference processing rate increases, and the global conference parameter is upgraded. However, in the example shown in FIG. 4, different thresholds may be used when upgrading the global conference parameter, as compared to when downgrading the global conference parameter. FIG. 4 illustrates non-limiting, example implementations that may employ a form of hysteresis to stabilize transitions of the global conference parameter as the conference processing rate increases or decreases over time.

In the example shown in FIG. 4, when the conference processing rate drops increases beyond 80 conferences per second, then the global conference parameter may transition from "overloaded" (region 416) to "heavily" loaded (region 418).

When the conference processing rate drops increases beyond 120 conferences per second, then the global conference parameter may transition from "heavily" loaded (region 418) to "lightly" loaded (region 420).

When the conference processing rate drops increases beyond 180 conferences per second, then the global conference parameter may transition from "lightly" loaded (region 420) to "normally" loaded (region 422).

Figure 5:
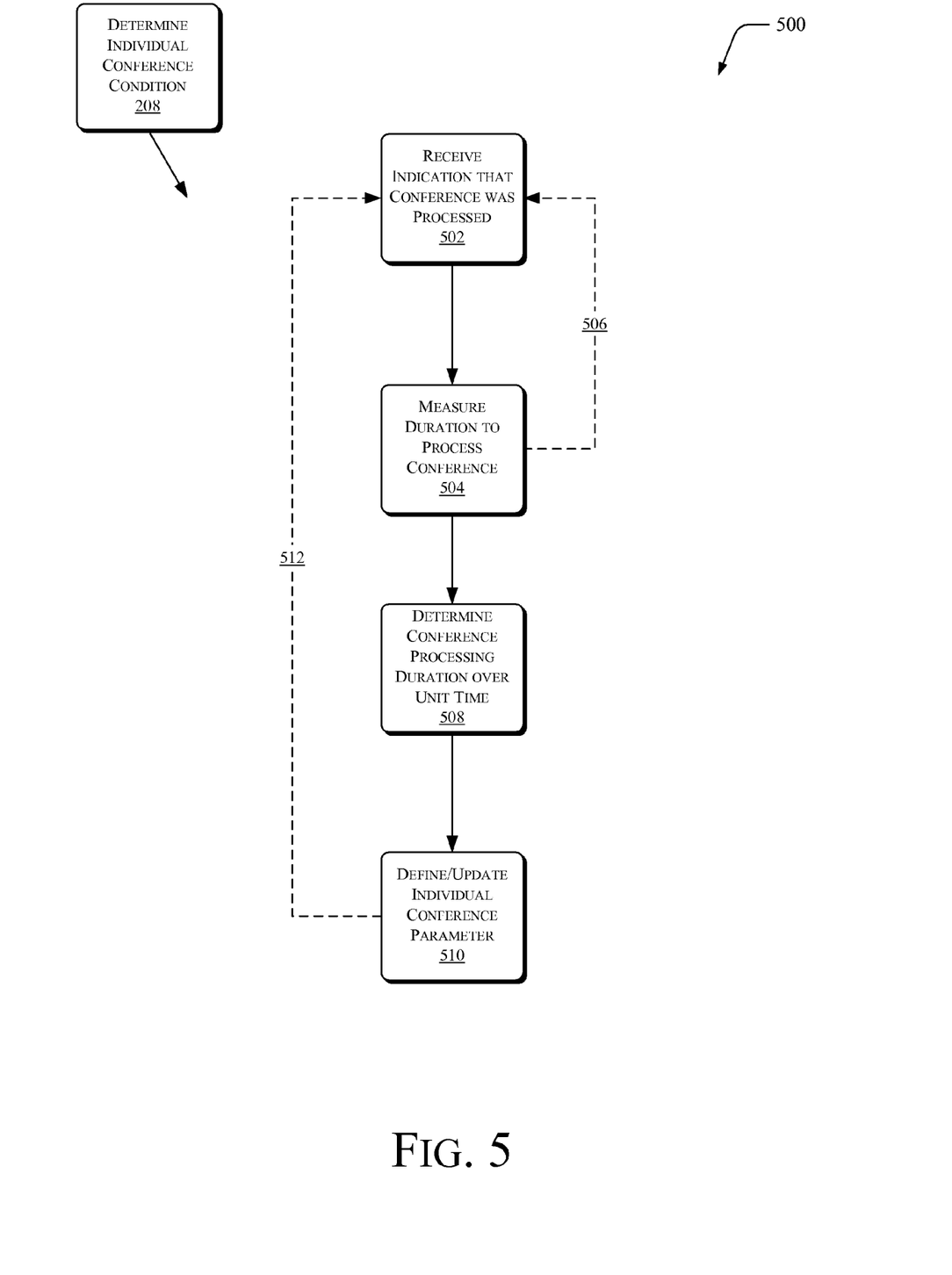
FIG. 5 is a flow diagram illustrating processes for determining conditions of conferences individually.

Having described transitions between different global conference conditions in FIG. 4, the discussion now turns to a description of processes for determining conditions of conferences individually, now presented with FIG. 5.

FIG. 5 illustrates processes 500 for determining conditions of conferences individually. For convenience of description, but not to limit possible implementations, some items described previously may be carried forward into FIG. 5 and denoted by similar reference signs. Additionally, for ease of reference only, the processes 500 are described in connection with the module 208 for determining conditions of conferences individually. However, it is noted that implementations of these processes 500 may be executed on components or systems other than the module 208 without departing from the scope and spirit of the description herein.

Block 502 represents receiving an indication that a given conference was processed. FIG. 2 illustrates examples of such conference processing at 204a and 204n, and the description above provides several non-limiting examples of such processing. Additionally, FIG. 1 provides examples of conferences at 104a and 104n.

Block 504 represents storing an indication that a given conference was processed. Put differently, block 504 may represent storing data that forms the basis for determining how much time was spent in processing the given conference, as calculated over some suitable time interval. In this manner, block 504 represents storing historical data for computing the duration of time that was spent between one or more of these successive instances of processing the given conference.

As indicated by the dashed line 506, the processes 500 may repeated perform blocks 502 and 504 repeatedly as the conferences (e.g., 104) are processed. In some implementations, the processes 500 may perform blocks 502 and 504 as a background process that tracks when particularly individual conferences have been processed over some interval of time.

Block 508 represents determining the duration of time that was spent in processing the given conference. Block 508 may make this determination by accessing information stored by block 504, which information indicates processing history gathered over an interval of time (e.g., the previous ten seconds).

Block 510 represents calculating a parameter that represents a condition or health associated individually and respectively with the conferences hosted by a given conferencing server. This individual conference parameter may indicate how much time was spent in processing each one of these conferences. As described herein, this quantity is termed a "conference processing duration". Block 510 may include updating the individual conference parameter over time.

As indicated by the dashed line 512, the processes 500 may be repeated indefinitely to track the processing duration of individual conferences over time, and to update accordingly the parameter representing the conference processing duration. The conference processing duration of various individual conferences, monitored over time, may indicate, at least in part, how heavily loaded the conferencing server is, and may indicate when remedial action is appropriate to alleviate the loading on the conferencing server.

Returning to the above example in which a conferencing server is hosting one large conference and numerous smaller conferences, recall that the global conference parameter described above may not reveal a declining condition of the large conference. This example assumed that the good "health" of the numerous smaller conferences may conceal the possibly declining health of the single large conference, as indicated by the composite or global conference processing rate. However, by also computing and considering the conference processing duration parameter, as shown in FIG. 5, the tools and techniques described herein may discover the condition of the single large conference featured in this example. Having discovered this condition of the single large conference, the conference condition module 118 may send appropriate signals 120 to the condition remediation module 122, which in turn may take action to remedy the condition of the single large conference.

Figure 6:
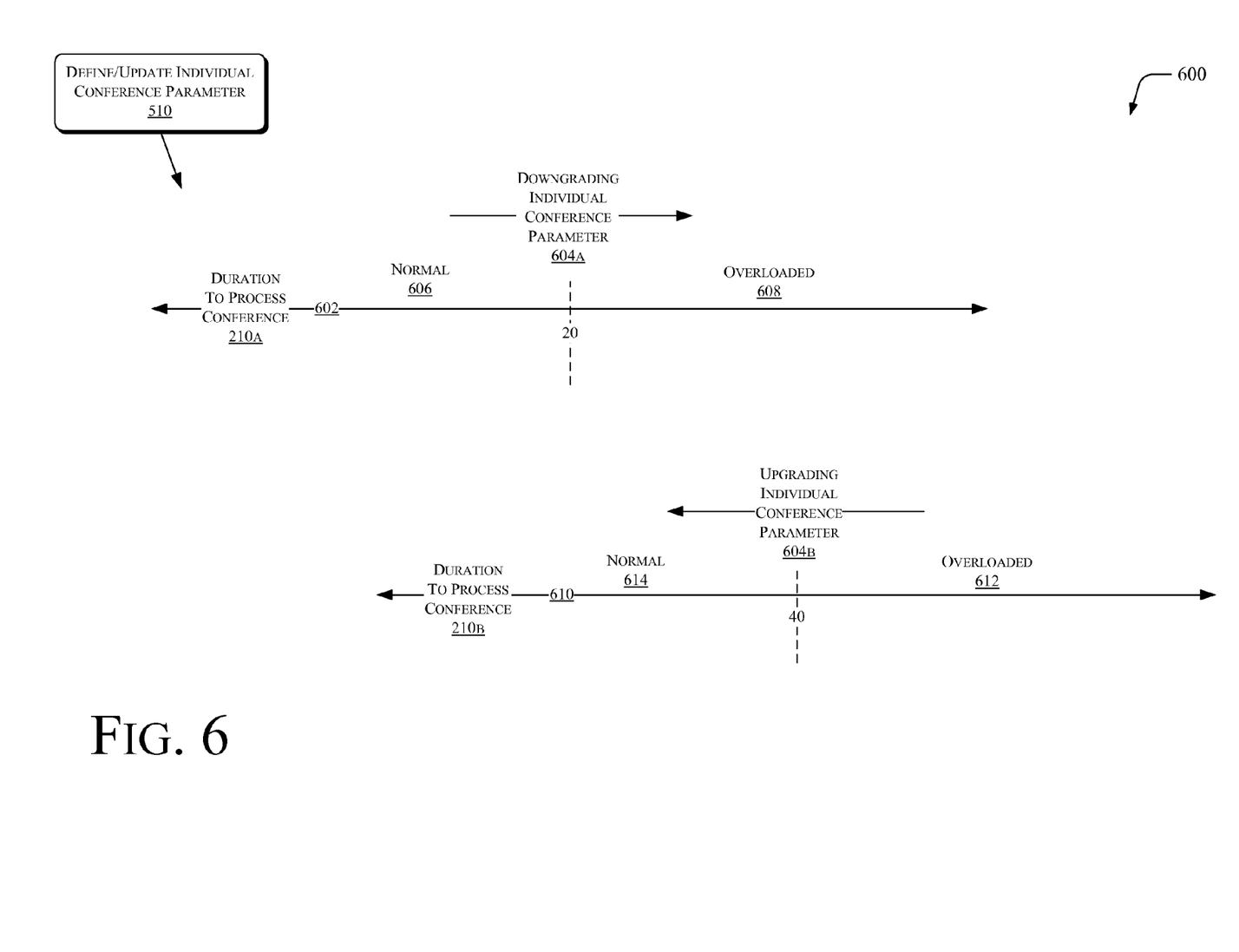
FIG. 6 is a diagram illustrating transitions between different individual conference conditions, and illustrating techniques for upgrading and/or downgrading the individual conference conditions as a duration between conference processing changes over time.

Having described processes for determining conditions of conferences individually in FIG. 6, the discussion now turns to a description of transitions of the conference condition for individual conferences, now presented with FIG. 6.

FIG. 6 illustrates transitions, denoted generally at 600, between different conditions or states of individual conferences, and illustrates techniques for upgrading and/or downgrading a parameter reflecting the condition or state of individual conference, in response to the duration in processing a given conference changes over time. For convenience of description, but not to limit possible implementations, some items described previously may be carried forward into FIG. 6 and denoted by similar reference signs. Additionally, for ease of reference only, the transitions and related techniques 600 are described in connection with the module 510 for defining and updating parameters reflecting the conditions of individual conferences. However, it is noted that implementations of the transitions and related techniques 600 may be executed on components or systems other than the module 510 without departing from the scope and spirit of the description herein.

FIG. 6 carries forward from FIG. 2 an example of the duration in conference processing, denoted at 210a. As shown in FIG. 6, several example thresholds for this conference processing duration are arranged along an axis 602. As discussed above with FIG. 4, these thresholds are provided only to facilitate description, but not to limit possible implementations. The examples described herein express this duration in terms of milliseconds, but it is noted that other units of measurement may be appropriate in certain applications as well.

In the example provided in FIG. 6, when the duration between instances of processing a given individual conference increases beyond 20 milliseconds, the individual conference parameter, denoted at 604*a*, may be downgraded. More specifically, the individual conference parameter 604*a* may transition from a "normal" region, denoted at 606, to an "overloaded" region, denoted at 608.

As described above with FIG. 4, some implementations of the transitions shown in FIG. 6 may employ a form of hysteresis, in that different thresholds may apply to upgrading the individual conference parameter, as compared to downgrading the individual conference parameter. Thus, to illustrate these implementations, FIG. 6 carries forward, at 210*b*, another example of a duration between instances of processing a given conference. Example thresholds for these individual conference parameters are arranged along an axis 610. In the example shown, when the duration between instances of processing a given individual conference decreases below 40 milliseconds, the individual conference parameter, denoted at 604*b*, may transition from an "overloaded" region 612 to a "normal" region 614.

CONCLUSION

Although the systems and methods have been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain data and process flow diagrams described and illustrated herein, it is noted that the processes and sub-processes depicted therein may be performed in orders other than those illustrated without departing from the spirit and scope of the description herein. Also, while these data and process flows are described in connection with certain components herein, it is noted that these data and process flows could be performed with other components without departing from the spirit and scope of the description herein.

The invention claimed is:

1. At least one machine-readable storage medium comprising machine-readable instructions that, when executed by a machine, cause the machine to perform a method comprising:
   calculating at least one global conference parameter representing a rate at which a plurality of conferences are processed by a conferencing server, the rate indicating how many of the plurality of conferences the conference server is processing per unit time;
   generating at least one signal representing the rate at which the plurality of conferences are processed, a value of the signal indicating how heavily loaded the conferencing server is at a given time; and
   calculating at least one individual conference parameter representing a duration of time spent in processing at least one of the conferences.

2. The machine-readable storage medium of claim 1, further comprising instructions for receiving an indication that one of the conferences has been processed.

3. The machine-readable storage medium of claim 1, further comprising instructions for storing an indication that one of the conferences has been processed.

4. The machine-readable storage medium of claim 1, wherein the instructions for calculating at least one global conference parameter include instructions for determining how many of the conferences have been processed over a predetermined interval of time.

5. The machine-readable storage medium of claim 1, wherein processing the conferences includes processing at least one packet associated with at least one of the conferences.

6. The machine-readable storage medium of claim 1, further comprising instructions for establishing at least one threshold applicable to calculating the global conference parameter.

7. The machine-readable storage medium of claim 6, further comprising instructions for downgrading the global conference parameter in response to the rate decreasing below the threshold.

8. The machine-readable storage medium of claim 6, further comprising instructions for upgrading the global conference parameter in response to the rate increasing above the threshold.

9. The machine-readable storage medium of claim 6, further comprising instructions for establishing at least a further threshold applicable to the rate at which the conferences are processed.

10. The machine-readable storage medium of claim 9, further comprising instructions for downgrading the global conference parameter in response to the rate decreasing below the threshold.

11. The machine-readable storage medium of claim 10, further comprising instructions for upgrading the global conference parameter in response to the rate increasing above the further threshold.

12. The machine-readable storage medium of claim 1, further comprising instructions for establishing at least one threshold applicable to calculating the individual conference parameter.

13. The machine-readable storage medium of claim 12, further comprising instructions for downgrading the individual conference parameter in response to the duration of time increasing above the threshold.

14. The machine-readable storage medium of claim 12, further comprising instructions for upgrading the individual conference parameter in response to the duration of time decreasing below the threshold.

15. The machine-readable storage medium of claim 12, further comprising instructions for establishing at least a further threshold applicable to calculating the individual conference parameter.

16. The machine-readable storage medium of claim 15 further comprising instructions for downgrading the individual conference parameter in response to the duration of time increasing above the threshold.

17. The machine-readable storage medium of claim 16, further comprising instructions for upgrading the global conference parameter in response to the duration of time decreasing below the further threshold.

18. A system comprising:
    one or more processors;
    memory;
    a conference condition determination module stored in the memory and executable by the one or more processors that is configured to generate at least:

a first signal representing a rate at which a plurality of conferences are processed, a corresponding value of the signal indicating how heavily loaded the server is at a given time, and a second signal representing a duration of time between instances of processing at least one of the plurality of conferences; and a condition remediation module configured to select a new codec that consume network bandwidth less than a current codec used for the at least one of the plurality of conferences in response to determining that the first signal decreases below a first threshold or the second signal increases beyond a second threshold.

19. The system of claim 18, wherein the condition remediation module is further configured to send a particular type of frames that consume a least amount of bandwidth for the at least one of the plurality of conferences in response to determining that the first signal decreases below the first threshold or the second signal increases beyond the second threshold.

20. The system of claim 19, wherein the particular type of frames comprises an I-frame.

* * * * *